United States Patent
Szymusiak et al.

(10) Patent No.: US 10,166,665 B2
(45) Date of Patent: Jan. 1, 2019

(54) DISCONNECTION TOOL FOR QUICK-DISCONNECT COUPLINGS

(71) Applicant: Ford Global Technologies, LLC, Dearborn, MI (US)

(72) Inventors: Scott J. Szymusiak, Canton, MI (US); Nicholas Girardi, Milford, MI (US); Donald M. Lawrence, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 14/992,340

(22) Filed: Jan. 11, 2016

(65) Prior Publication Data

US 2017/0197303 A1    Jul. 13, 2017

(51) Int. Cl.
| | |
|---|---|
| *B25B 27/10* | (2006.01) |
| *B25B 27/14* | (2006.01) |
| *F16B 7/04* | (2006.01) |

(52) U.S. Cl.
CPC .............. *B25B 27/14* (2013.01); *B25B 27/10* (2013.01); *F16B 7/042* (2013.01)

(58) Field of Classification Search
CPC ......... B25B 27/04; B25B 27/10; B25B 27/20; B25B 27/205; B25B 27/304; B25B 3/00; B25B 33/00; B25B 5/163; B25B 9/00; B25B 9/02; H01L 21/68721; H01L 21/68728; H01L 21/687; Y10T 29/5367
USPC ...... 269/16, 2, 54.2, 54.4; 29/249, 237, 282; 294/99.2; 81/487, 427, 58.2, 3.8
See application file for complete search history.

(56) References Cited

U.S. PATENT DOCUMENTS

| | | | | | |
|---|---|---|---|---|---|
| 1,456,007 | A | * | 5/1923 | Hartson | .................. B25B 27/24 131/259 |
| 1,520,716 | A | * | 12/1924 | Judd | ........................ H02G 1/02 114/218 |
| 1,807,509 | A | * | 5/1931 | Clark | ...................... B25B 27/24 29/249 |
| 1,851,681 | A | * | 3/1932 | Muzzy | .................... B25B 27/24 29/249 |

(Continued)

OTHER PUBLICATIONS

Ford Service Bulletin #Dec. 19, 1993; Ford Motor Company; Dec. 19, 1993; accessed on-line on Oct. 27, 2015, on Autozone.com.

*Primary Examiner* — Tyrone V Hall, Jr.
(74) *Attorney, Agent, or Firm* — Julia Voutyras; Brooks Kushman P.C.

(57) ABSTRACT

A hand tool for releasing a quick-detach coupling (QDC) from engagement with a mating component includes a handle having first and second spaced-apart forks defining a gap therebetween, a generally U- or V-shaped elastic element attached to the handle and having first and second arms with distal ends disposed adjacent opposite sides of the gap, and first and second contact elements attached to the ends of the respective arms and projecting toward the gap. The tool is adapted to be positioned adjacent to and urged toward a QDC so the forks encircle the QDC. Outward pressure on the contact elements causes the elastic arms to flex outwardly until the contact elements come to bear against and depress latch tabs on the surface of the QDC, thereby releasing a latching mechanism of the QDC so that it may then be pulled axially out of engagement with a mating component.

17 Claims, 4 Drawing Sheets

(56) References Cited

U.S. PATENT DOCUMENTS

| | | | | | |
|---|---|---|---|---|---|
| 1,861,973 | A | * | 6/1932 | Mindermann | B25B 27/24 29/249 |
| 2,091,500 | A | * | 8/1937 | Clark | B25B 27/24 29/249 |
| 2,199,685 | A | * | 5/1940 | Wood | A45D 26/0071 294/99.2 |
| 2,640,382 | A | * | 6/1953 | Grossman | B25B 13/08 29/253 |
| 3,239,263 | A | * | 3/1966 | Farmer | B66C 1/48 294/114 |
| 3,653,708 | A | * | 4/1972 | Merola | B23Q 7/043 294/102.1 |
| 4,711,595 | A | * | 12/1987 | Magid | B25B 27/14 403/108 |
| 6,612,634 | B1 | * | 9/2003 | Zoppas | B25J 15/0206 294/106 |
| 8,066,270 | B2 | * | 11/2011 | Siegel | B25B 1/2452 269/272 |
| 2002/0064420 | A1 | * | 5/2002 | Lin | B25B 7/02 403/217 |
| 2005/0029727 | A1 | * | 2/2005 | Siegel | B25B 1/08 269/266 |
| 2010/0304935 | A1 | * | 12/2010 | Todokoro | B25B 7/02 482/35 |
| 2013/0068803 | A1 | * | 3/2013 | Brodeur | A47G 25/88 223/113 |
| 2016/0245441 | A1 | * | 8/2016 | Klein | F16L 33/00 |

\* cited by examiner

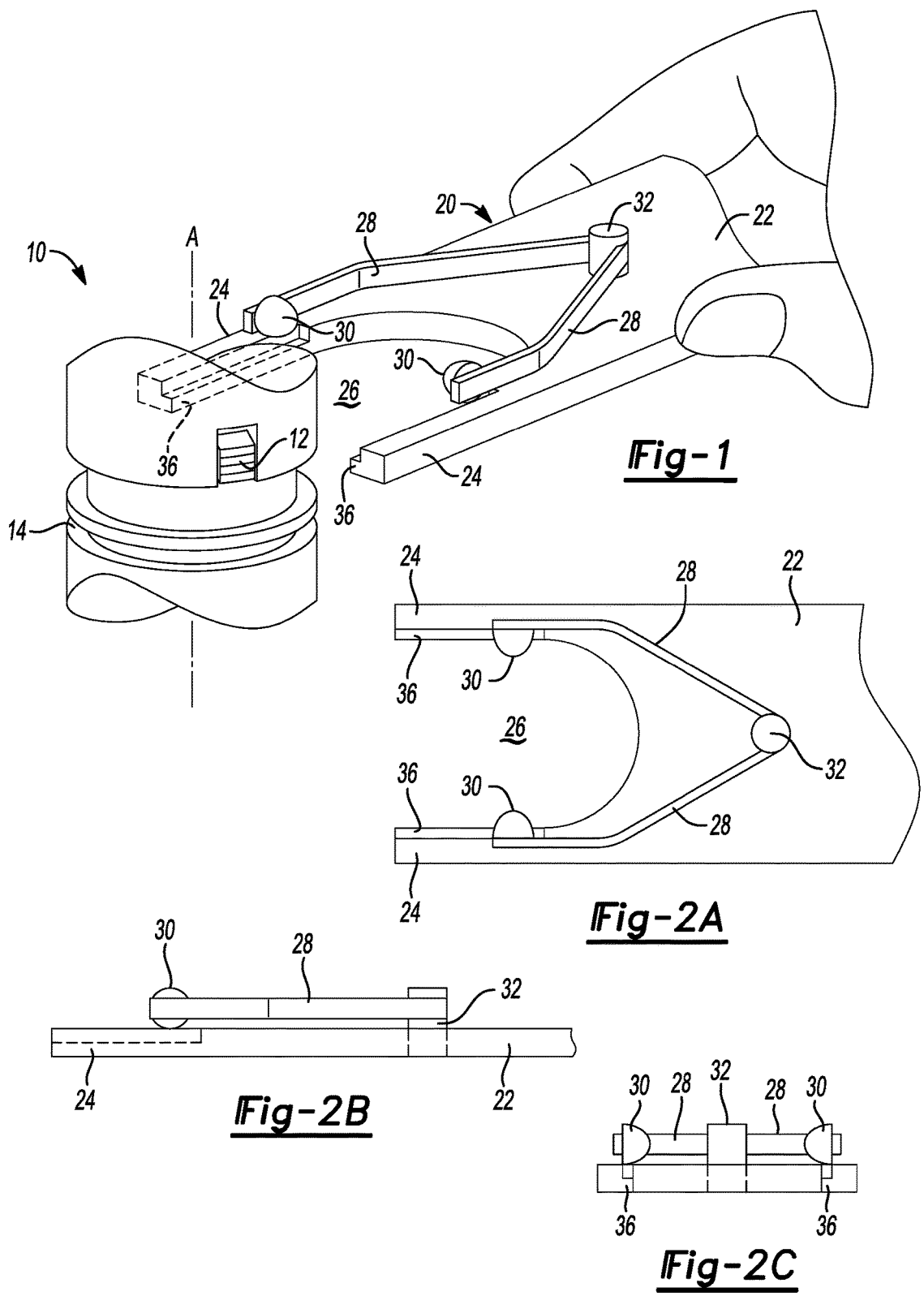

DISCONNECTION TOOL FOR QUICK-DISCONNECT COUPLINGS

TECHNICAL FIELD

This disclosure relates to quick-disconnect fluid couplings and to a hand tool used to disconnect said couplings.

BACKGROUND

Quick-disconnect couplings (abbreviated as "QDCs") are used to provide fast and easy connection and disconnection of fluid lines. These couplings are also known as quick connects or quick release couplings. Typically quick-disconnect couplings are operated by hand and often are used to replace coupling connections which require tools to assemble and disassemble. Quick-disconnect fluid couplings are used in a wide range of applications where two fluid-carrying components (hoses, pumps, reservoirs, etc.) are required to be connected with one another in a manner so that they may be relatively easily disconnected for service or repair of the related fluid system. Disconnection of the QDC from its mating connector may be necessary when, for example, the involved system requires repair or servicing (such as to replace a defective component or change fluid).

A quick-disconnect coupling (QDC) typically includes a mechanical latching mechanism that holds the coupling in engagement with a mating component until a user manually releases the latching mechanism by some sort of movement such as pressing one or more latches radially inward and/or axially.

In many practical applications of QDCs, limited space around the coupling and mating/related components due to packaging constraints makes it difficult to reach the latching mechanism with the user's hand/fingers in order to manipulate the latch. The accumulation of dirt or other contaminants during use may also "gum up" the latch mechanism, making manual actuation difficult.

It is known to use a general-purpose or special-purpose tool, rather than one's fingers, to actuate the QDC's latch mechanism. For example, a pair of pliers of the proper size may be used to grip the coupling and/or to squeeze inwardly on a latching mechanism. If there is limited space around the coupling, however, it may be difficult or impossible to reach and engage the coupling effectively with pliers or similar tools. Further, the leverage provided by a pliers-type tool increases the likelihood that the user will apply excessive force to a coupling, which may result in a damaged or broken connector (and/or the mating component) requiring the replacement of one or both components and thereby adding to the repair/service time and cost.

SUMMARY

According to an embodiment disclosed herein, a hand tool for releasing a quick-detach coupling (QDC) from a mating component comprises a handle having first and second spaced-apart forks defining a gap therebetween, an elastic element attached to the handle and having first and second arms with distal ends disposed adjacent opposite sides of the gap; and first and second contact elements attached to the ends of the respective arms and projecting toward the gap whereby outward pressure on the contact elements causes the arms to flex outwardly. The tool is adapted to be positioned adjacent to and urged toward a QDC so the forks encircle the QDC and the contact elements depress latch tabs on the surface of the QDC, thereby releasing a latching mechanism of the QDC so that it may then be pulled axially out of engagement with a mating component.

According to another embodiment, a hand tool comprises a handle having first and second forks spaced apart to receive therebetween a quick-disconnect coupling, first and second contact elements disposed adjacent the first and second forks respectively to engage respective first and second release tabs on opposite sides of the coupling when the coupling is between the forks, and an elastic element urging at least one of the contact elements into engagement with a respective at least one of the release tabs. The elastic element may be generally V-shaped or U-shaped with the first and second contact elements attached to respective distal ends of the elastic element.

According to another embodiment, a hand tool comprises a handle having first and second forks spaced apart to define a gap therebetween, first and second contact elements disposed adjacent the first and second forks respectively on opposite sides of the gap and mounted to the handle for movement relative thereto toward and away from the gap, and an elastic element urging at least one of the contact elements toward the gap.

The disclosed tool may be used to easily and quickly unlatch a QDC from engagement with a mating connector even when there is such limited space around the QDC that it cannot be accessed with a conventional tool such as a pair of pliers.

BRIEF DESCRIPTION OF THE DRAWINGS

FIG. 1 is a perspective view of an embodiment of a tool as disclosed herein along with an example of a quick-disconnect connector;

FIGS. 2A-2C present orthogonal top, side, and end views of the tool of FIG. 1;

DETAILED DESCRIPTION

Figure 3A:
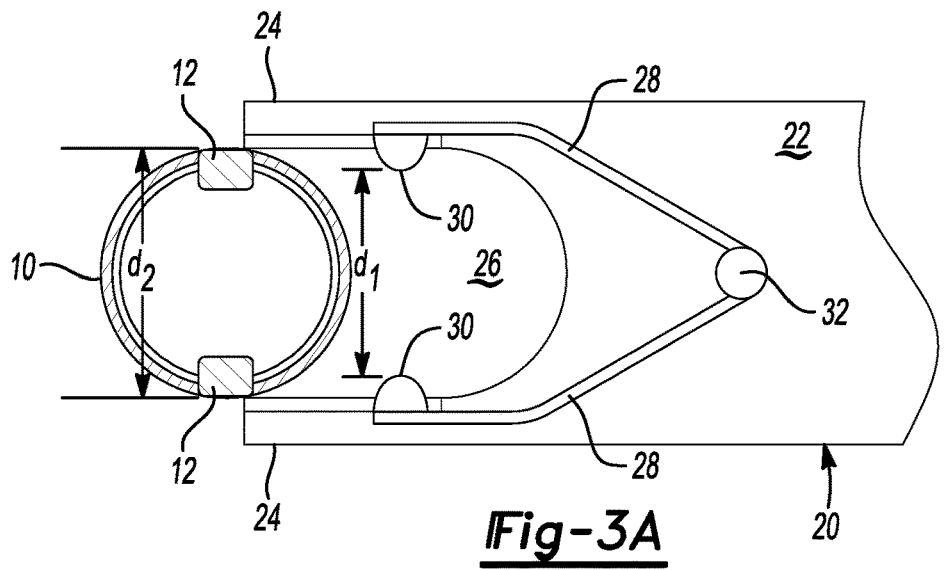
FIG. 3A-3C present, in simplified form, the sequence of engaging the tool of FIG. 1 with a quick-disconnect connector.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, a tool 20 according to a first embodiment of the present invention is shown along with a quick-disconnect coupling (QDC) 10. The tool 20 is used to unlatch the QDC 10 from a mating fitting (not shown) attached to another component of the fluid system, as is described below.

QDC 10 is of a type well-known in the prior art and is typically used to terminate a length of fluid-carrying tubing (not shown). Such a QDC may, for example, be used in automotive vehicle systems to carry fuel, brake fluid, or a diesel exhaust aftertreatment liquid such a urea.

A high-pressure, fluid-tight connection between QDC 10 and a mating component is achieved by moving the QDC and the mating component toward one another along axis A into engaging contact. (Usually, but not necessarily, the QDC fits over/around the mating component.) This engagement causes a latching mechanism internal to the QDC to engage complementary features of the mating component to hold the two parts together and effectively resist "pull-out" relative to one another.

The QDC's latching mechanism is released from engagement with the mating component by pressing radially inward on latch tabs 12 (only one of which is visible in FIG. 1) located on diametrically opposite sides of the QDC 10. Latch tabs 12 are the only components of the latching mechanism pertinent to the present invention, and accordingly are the only components of the latching mechanism shown in the present drawings. The QDC 10 may then be pulled axially away from the mating component. Some QDCs are known to have a latching mechanism which requires that the QDC be moved axially relative to the mating component in addition to depressing the latch tabs 12. Disconnection of the QDC from its mating connector may be necessary when, for example, the involved system requires repair or servicing (such as to replace a defective component or to exchange fluid).

Tool 20 comprises a handle 22 with a bifurcated end forming left and right forks 24 defining therebetween a gap 26. Gap 26 is of sufficient width to receive the QDC 10 in manner to be described below. Handle 22 and forks 24 are preferably formed of a substantially rigid material such as metal or a rigid plastic. Handle 22 is shown as having a simple, generally rectangular form but may be sized, shaped, contoured, and/or textured to enhance gripping by a user's fingers and/or for purely esthetic reasons. The overall width of tool 20, and particularly the width at the forked end of the tool, is preferably kept to a minimum so that the tool can be utilized when there is limited clearance around the QDC 10.

A generally U- or V-shaped elastic element 28 is disposed adjacent to the upper (as viewed in FIG. 1) surface of the handle 22 and is connected to a peg 32 by which the element is mounted to the handle 22. Left and right arms of the elastic element 28 extend toward the respective forks 24 so that their distal ends are adjacent opposite sides of the gap 26. The elastic element 28 is attached to the handle 22 only by the peg 32, and is formed of a stiff but elastically deformable material so that the arms may deflect outwardly (away from one another) from the neutral or un-deflected positions (shown in FIGS. 1, 2A-C, and 3) when sufficient pressure is applied to their distal ends. Contact elements 30 are attached to the ends of the arms of element 28 distal from peg 32 and project inwardly (toward the gap 26) therefrom. Elastic element 28, contact elements 30, and peg 32 may all be formed from metal or plastic materials having appropriate mechanical properties.

Elastic element 28 may advantageously be formed from a unitary piece of thin spring-steel (or other material having appropriate elastic modulus) formed into a generally U- or V-shape, or the element may comprise two separate arms which are separately connected to the peg 32 or directly to the handle 22. Alternatively, the ends of the two arms of the elastic element 28 may be connected to the handle 22 independently of one another and at separate locations.

The terms "generally U-shaped" and "generally V-shaped" as used herein are both defined as a shape formed by two, spaced apart cantilever arm connected to one another at a vertex or bight and extending therefrom to define a gap therebetween. The term does not exclude a component in which one or more of the arms are curved or comprise any combination of straight and curved segments.

Figure 3B:
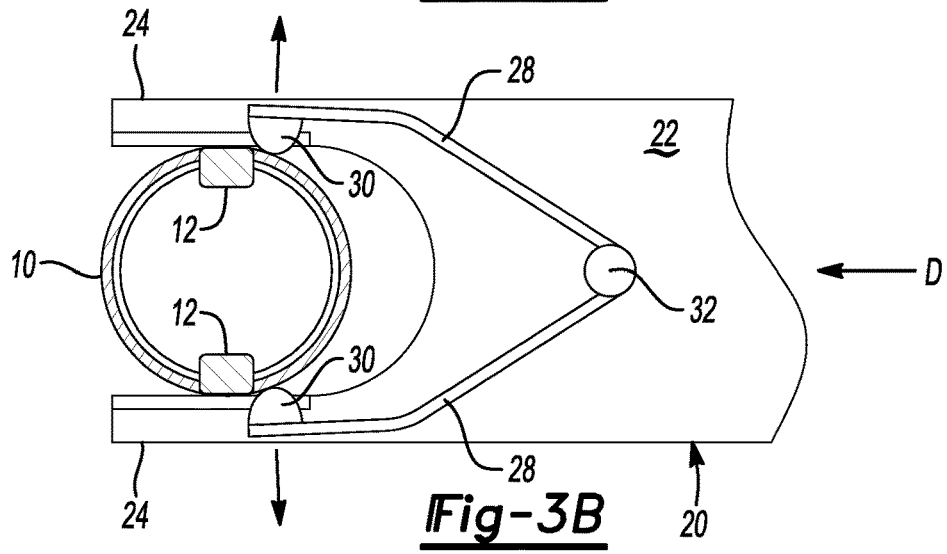
Figure 3C:
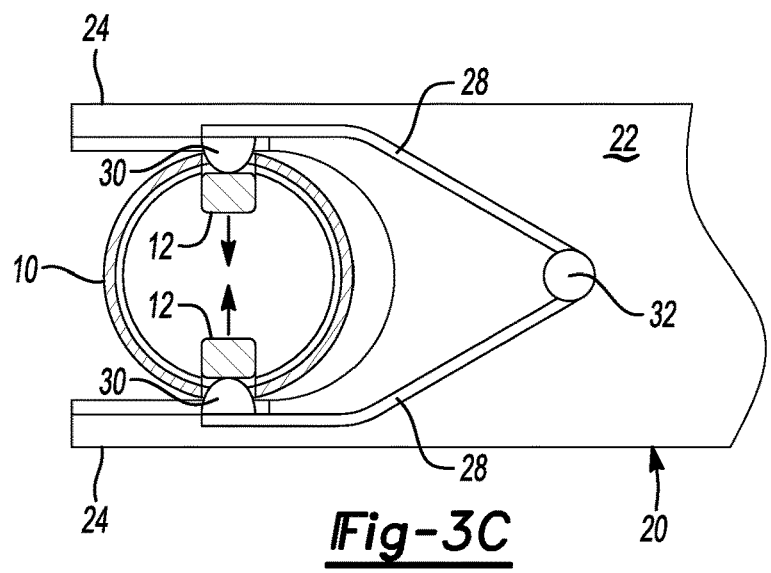

FIGS. 3A-C depict a sequence of steps in which the tool 20 is used to release the latching mechanism of QDC 10 so that the QDC may be disengaged from its mating component. First, as shown in FIG. 3A, the tool 20 is positioned so that the plane defined by the forks 24 is normal to the longitudinal axis A of the QDC 10, and the tips of forks are adjacent to and generally aligned with the latch tabs 12 on opposite sides of the QDC. In this position, the inner edges of forks 24 (that is, the edges immediately adjacent to the gap 26) are aligned with and begin to engage a groove 14 formed around the circumference of QDC 10.

The inner edges of the forks 24 have a thickness slightly less than the width of the groove 14 so that they slide into the groove with little resistance. In the depicted embodiment, this is achieved by forming the forks 24 with a reduced-thickness ledge 36 matching the width of the groove 14. This is by way of example only, however, as the forks 24 may have any cross-sectional shape so long as the inner edges are able to fit into the groove 14.

As seen in FIG. 3A, the distance $d_1$ between the contact elements 30 when the arms of element 28 are at rest (undeflected) is smaller than distance $d_2$ across the outermost and opposing surfaces of the tabs 12. The distance $d_2$ may or may not be substantially equal to the outside diameter of QDC 10.

Next, as seen in FIG. 3B, the tool 20 is moved further toward the QDC (in direction D) so that the QDC moves farther into the gap 26. The engagement of the inner edges of the forks 24 with the groove 14 ensures that the tool 20 remains in proper overall alignment with the QDC 10 and, most importantly, does not inadvertently slip along the longitudinal axis A. In this condition, the contact elements 30 contact and begin to slide over the outer surface of QDC 10 at positions nearly diametrically opposite one another. This physical interference between the contact elements 30 and the QDC 10 causes the arms of element 28 to deflect (in the manner of cantilever beams) outwardly relative to the QDC and the gap 26 so that the contact elements are pressing inwardly on the QDC. Contact elements 30 may be of any shape appropriate to effectively engage the latch tabs 12, and may advantageously have smooth, rounded inner surfaces so as to slide easily over the outer surface of QDC 10 without causing damage thereto.

FIG. 3C illustrates the latch-release condition wherein the tool 20 is positioned relative to QDC 10 such that the contact elements 30 engage and bear upon latch tabs 12. In this latch-release condition, the inwardly-directed force generated by the elastic bending of element 28 urges the contact elements 30 against the latch tabs 12 with sufficient force to move the tabs inwardly as is required to release the latch mechanism of the QDC 10. The level of inward force generated by the elasticity of element 28 is sufficient to overcome the designed resistance to movement of latch tabs 12 and any additional resistance such as may occur due to the latch mechanism being contaminated by dirt, grit, grime, or fluid that may be present in its installed environment. As will be apparent to a person of ordinary skill in the art, a sufficient level of inward force may be obtained by proper selection of the materials and geometries of the respective parts of the element 28.

Engagement of the forks 24 with the groove 14 allows the user to urge the QDC axially relative to the mating component if such movement is also necessary to release the latch mechanism requires. After the latch mechanism is released, the QDC 10 may be removed from engagement with the mating component using the tool 20.

It will be seen that the disclosed tool 20 may be used to unlatch and remove a QDC even when there is such limited space around the QDC that it cannot be accessed with a conventional tool such as a pair of pliers.

Figure 4:
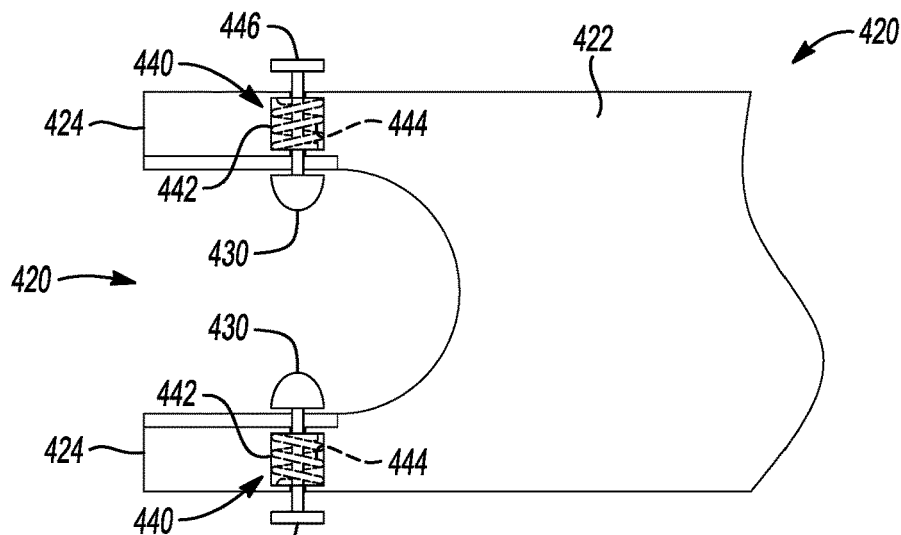
FIG. 4 is a simplified view of a second embodiment tool according to the present disclosure.

FIG. 4 illustrates an alternative embodiment of a QDC removal tool, generally indicated at 420, having a pair of spring-actuated units 440 mounted to the forks 424 on opposite sides of the gap defined between the forks. Each unit 440 comprises a housing 442 fixed to its respective fork 424, a coil spring 444 contained within the housing, and a plunger 446. The respective springs 444 serve as elastic elements urging the plungers 446 inwardly toward the gap between the forks 424 so that the contact elements 430 at the inner ends of the plungers 446 are urged against and depress the latch tabs 12 of a QDC 10 in a manner similar to that shown in FIGS. 3A-C for the first embodiment.

Figure 5:
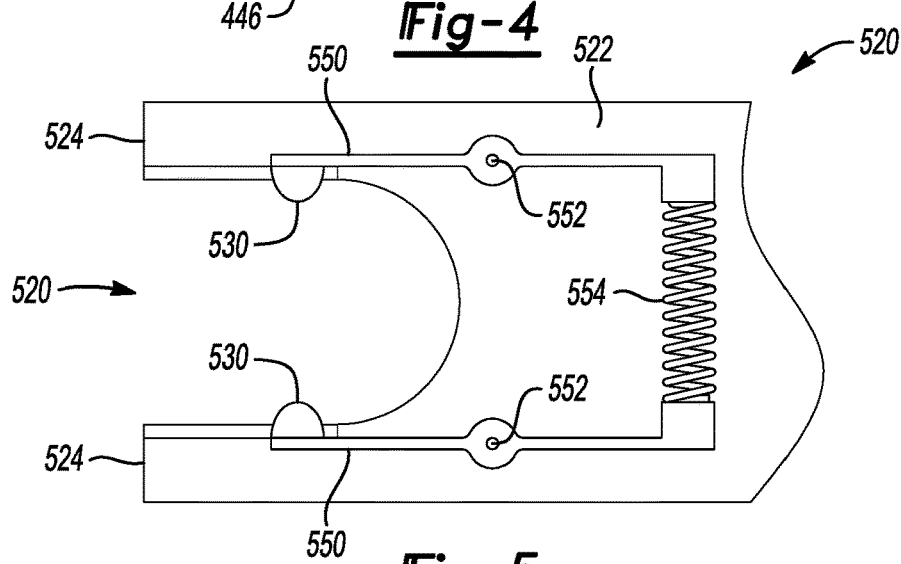
FIG. 5 is a simplified view of a third embodiment tool according to the present disclosure.

FIG. 5 illustrates a third embodiment of a QDC removal tool, generally indicated at 520, in which left and right pivot members 550 are pivoting mounted to a handle 522 at pivot points 552. A contact element 530 is provided at the end of each pivot members 550 adjacent to the gap 26. A coil spring 554 extends between the ends of the pivot members 550 distal from the gap 26 and is in compression. Spring 554 serves as an elastic element urging the lower (as viewed in FIG. 5) ends of the pivot members 550 outwardly relative to one another so that the contact elements 530 are urged inwardly toward to the gap. The contact members 530 therefore bear against and depress the respective latch tabs of a QDC in a manner similar to that shown in FIGS. 3A-C for the first embodiment.

Figure 6:
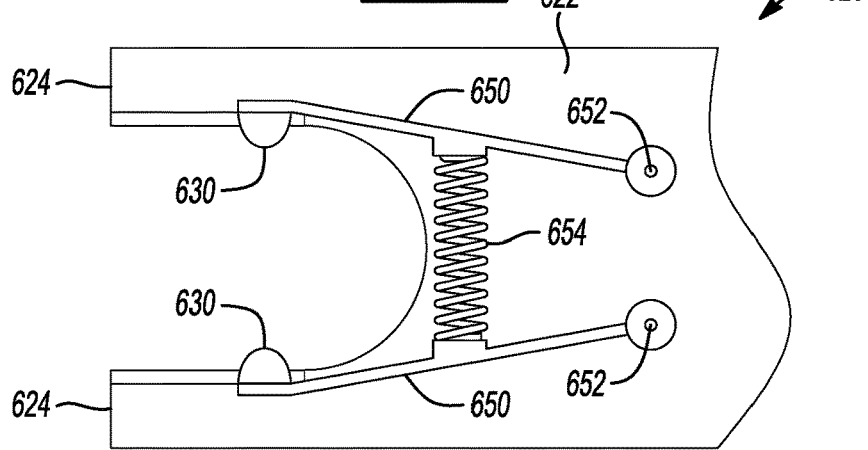
FIG. 6 is a simplified view of a fourth embodiment tool according to the present disclosure.

FIG. 6 illustrates a fourth embodiment of a QDC removal tool, generally indicated at 620, in which pivot arms 650 are mounted to the handle 622 at pivot points 652, and a tension member 654 is attached to the pivot members as shown. Tension member 654 may be a coil spring, as shown, or an elastic tension member made from rubber or other elastomer. Tension member 654 serves as an elastic element urging the pivot arms 650 toward one another so that contact elements 630 at the distal ends of the arms will bear against and depress the QDC latch tabs 12 in a manner similar to that shown in FIGS. 3A-C for the first embodiment. Alternatively, the two pivot arms 650 could share a common pivot point.

Figure 7:
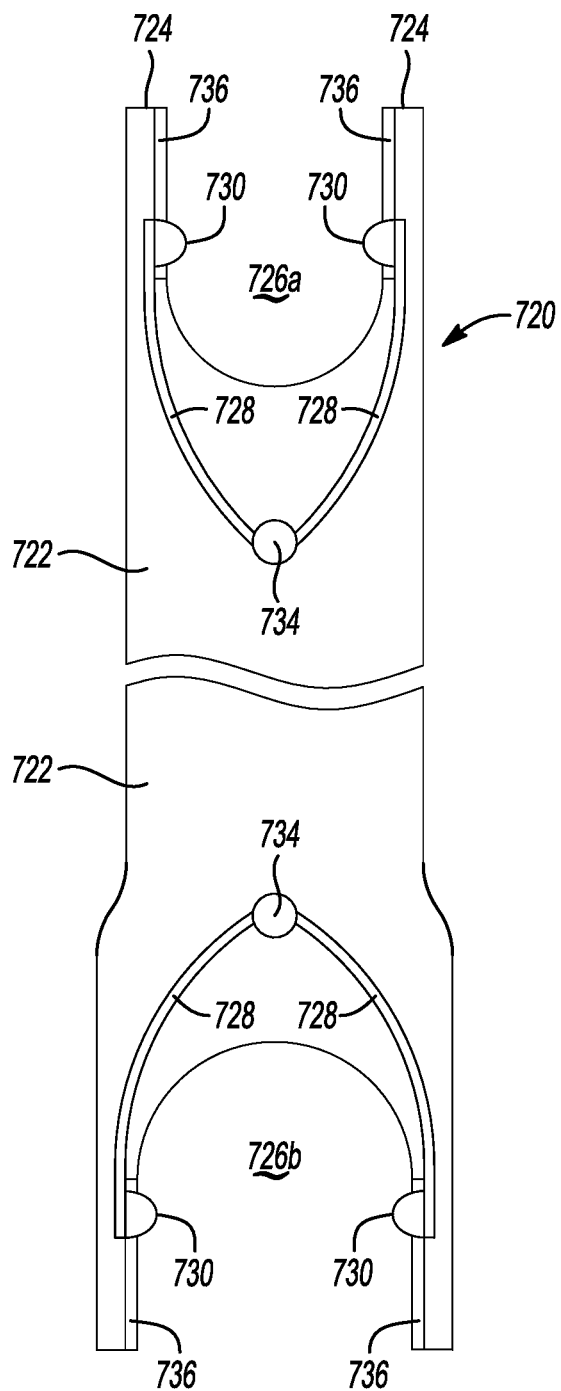
FIG. 7 is a simplified view of a fifth embodiment tool according to the present disclosure.

FIG. 7 illustrates a further embodiment of a tool 720 having two operating ends, one at each end of the handle 722, sized for use with two differently-sized QDCs (not shown). The widths of the inter-fork gaps 726a, 726b at the opposite ends are different from one another, and the sizes/geometries of the elastic elements 728 and contact elements 730 are matched to differently sized QDCs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tool comprising:
   a handle having first and second forks defining a gap therebetween, the forks having upper surfaces and opposing parallel ledges that step down from the upper surfaces adjacent to the gap;
   first and second convexly shaped contact elements disposed above the upper surfaces and projecting from the first and second forks, respectively, and into the gap; and
   an elastic element urging at least one of the contact elements into the gap.

2. The tool of claim 1, wherein a first end of the elastic element is mounted to the handle and the at least one of the contact elements is attached to an opposite second end of the elastic element.

3. The tool of claim 1, wherein the elastic element comprises first and second arms with respective distal ends thereof disposed adjacent opposite sides of the gap between the first and second forks, and the first and second contact elements are attached to respective distal ends of the first and second arms.

4. The tool of claim 1, wherein the at least one of the contact elements is attached to a member pivotably mounted to the handle and wherein the elastic element biases the member in rotation relative to the handle to urge the at least one of the contact elements toward the gap between the first and second forks.

5. The tool of claim 1, wherein the at least one of the contact elements is at an end of a plunger mounted to the handle for linear movement relative thereto, and the elastic element is a spring urging the plunger toward the gap between the first and second forks.

6. The tool of claim 1, wherein slots are defined between the first and second contact elements and the opposing parallel ledges.

7. The tool of claim 1, wherein the ledges originate at a first end of the handle, extend toward a second end of the handle, and terminate at an intermediate position between the first and second ends of the handle, and wherein the first and second contact elements are disposed above the upper surfaces between the first end of the handle and the intermediate position.

8. A tool comprising:
   a handle having first and second forks defining a gap therebetween, the forks having upper surfaces and opposing parallel ledges that step down from the upper surfaces adjacent to the gap;
   first and second convexly shaped contact elements disposed adjacent the first and second forks, respectively, on opposite sides of the gap and mounted to the handle for movement relative thereto toward and away from the gap; and
   an elastic element urging at least one of the contact elements into the gap.

9. The tool of claim 8, wherein a first end of the elastic element is mounted to the handle and the at least one of the contact elements is attached to an opposite second end of the elastic element.

10. The tool of claim 8, wherein the elastic element comprises first and second arms with respective distal ends of the arms disposed adjacent opposite sides of the gap, the first and second contact elements are attached to respective distal ends of the first and second arms.

11. The tool of claim 8, wherein the at least one of the contact elements is attached to a member pivotably mounted to the handle and wherein the elastic element biases the member in rotation relative to the handle to urge the at least one of the contact elements toward the gap between the first and second forks.

12. The tool of claim 8, wherein the at least one of the contact elements is at an end of a plunger mounted to the handle for linear movement relative thereto, and the elastic element is a spring urging the plunger toward the gap.

13. The tool of claim 8, wherein slots are defined between the first and second contact elements and the opposing parallel ledges.

14. The tool of claim 8, wherein the ledges originate at a first end of the handle, extend toward a second end of the handle, and terminate at an intermediate position between the first and second ends of the handle, and wherein the first and second contact elements are disposed above upper surfaces of the first and second forks, respectively, between the first end of the handle and the intermediate position.

15. A tool comprising:
a handle having first and second forks defining a gap therebetween, the forks having upper surfaces and parallel ledges stepping down from the upper surfaces along the gap;
an elastic element attached to the handle and having first and second cantilever arms with distal ends disposed adjacent opposite sides of the gap; and
first and second convexly shaped contact elements attached to the distal ends of the respective arms and projecting toward the gap.

16. The tool of claim 15, wherein the first and second contact elements are disposed above the upper surfaces such that slots are defined between the first and second contact elements and the parallel ledges.

17. The tool of claim 15, wherein the ledges originate at a first end of the handle, extend toward a second end of the handle, and terminate at an intermediate position between the first and second ends of the handle, and wherein the first and second contact elements are disposed above the upper surfaces between the first end of the handle and the intermediate position.

* * * * *